United States Patent
Kato et al.

(10) Patent No.: US 10,081,724 B2
(45) Date of Patent: Sep. 25, 2018

(54) SIDEWALL RUBBER COMPOSITION AND PNEUMATIC TIRE

(71) Applicant: THE YOKOHAMA RUBBER CO., LTD., Minato-ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/311,084

(22) PCT Filed: Dec. 19, 2014

(86) PCT No.: PCT/JP2014/083730
§ 371 (c)(1),
(2) Date: Dec. 21, 2016

(87) PCT Pub. No.: WO2015/173988
PCT Pub. Date: Nov. 19, 2015

(65) Prior Publication Data
US 2017/0101526 A1    Apr. 13, 2017

(30) Foreign Application Priority Data

May 16, 2014 (JP) ................................ 2014-102238
May 16, 2014 (JP) ................................ 2014-102242

(51) Int. Cl.
*C08L 13/00* (2006.01)
*B60C 1/00* (2006.01)
*C08L 7/00* (2006.01)

(52) U.S. Cl.
CPC ............ *C08L 13/00* (2013.01); *B60C 1/0025* (2013.01); *C08L 7/00* (2013.01); *C08L 2205/03* (2013.01)

(58) Field of Classification Search
CPC ........ C08L 13/00; C08L 7/00; C08L 2205/03; B60C 1/0025

USPC ......................................................... 524/495
See application file for complete search history.

(56) References Cited

U.S. PATENT DOCUMENTS

| 3,792,031 A | * | 2/1974 | Udding ................... C08C 19/22 525/340 |
| 2006/0084730 A1 | | 4/2006 | Fukushima et al. |
| 2010/0132868 A1 | * | 6/2010 | Hergenrother ............ B60C 1/00 152/564 |

FOREIGN PATENT DOCUMENTS

| JP | 2006-063284 A | | 3/2006 |
| JP | 2008-517071 A | | 5/2008 |
| JP | 2008-208163 A | | 9/2008 |
| JP | 2011016924 A | * | 1/2011 |
| JP | 2013-032471 A | | 2/2013 |

OTHER PUBLICATIONS

JP2011-016924A—machine translation.*

* cited by examiner

*Primary Examiner* — Ling Siu Choi
*Assistant Examiner* — Ronald Grinsted
(74) *Attorney, Agent, or Firm* — Carrier Blackman & Associates, P.C.; William D. Blackman; Joseph P. Carrier

(57) ABSTRACT

An object of the present invention is to provide a rubber composition for a sidewall having excellent low heat build-up and durability when formed into a tire, and a pneumatic tire using the rubber composition. The rubber composition for a sidewall according to the present invention comprises a diene rubber and carbon black; the diene rubber comprising: a modified polymer obtained by reacting a nitrone compound with double bonds of a conjugated diene polymer; and a natural rubber; a content of the modified polymer in the diene rubber being from 8 to 65 mass %; a nitrogen adsorption specific surface area of the carbon black being from 20 to 60[$\times 10^3$ $m^2$/kg]; and a content of the carbon black being from 30 to 67 parts by mass per 100 parts by mass of the diene rubber.

11 Claims, 1 Drawing Sheet

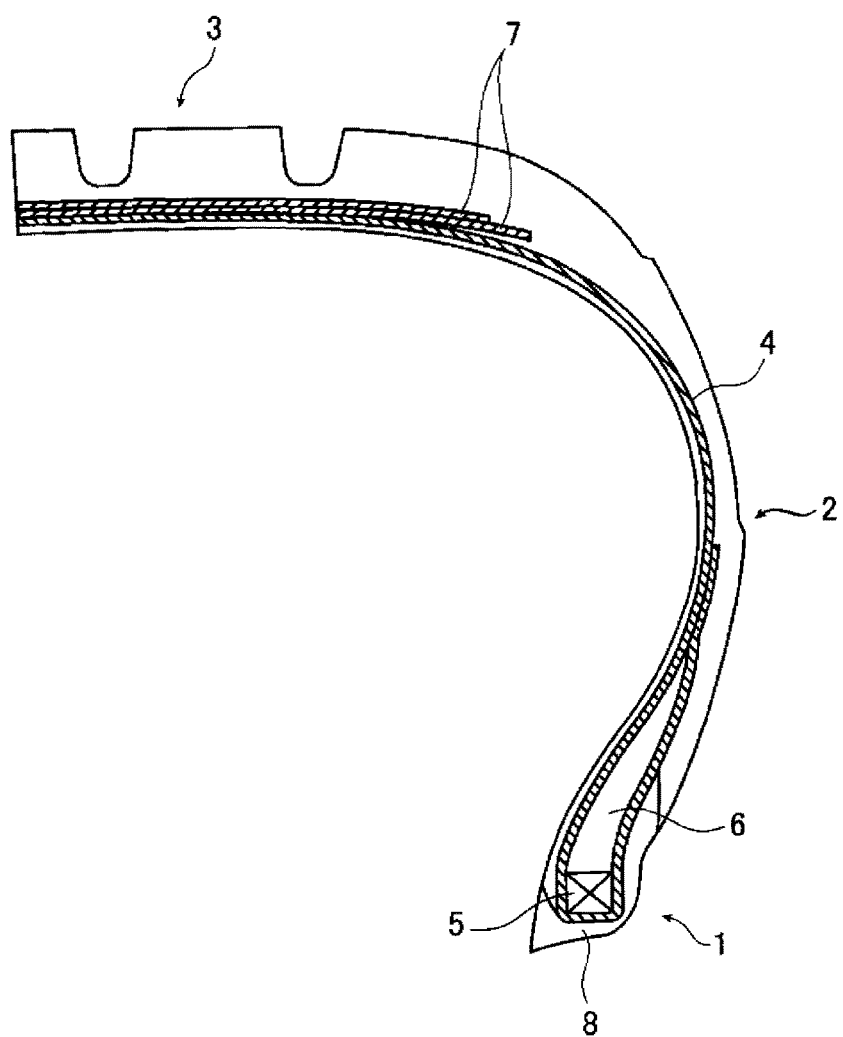

SIDEWALL RUBBER COMPOSITION AND PNEUMATIC TIRE

TECHNICAL FIELD

The present invention relates to a rubber composition for a sidewall and a pneumatic tire.

BACKGROUND ART

In order to achieve a reduction in automobile fuel consumption, there is a demand for the sidewall portion of a pneumatic tire to have excellent low heat build-up when formed into a tire.

Under such circumstances, a rubber composition for a tire sidewall containing a natural rubber, a butadiene rubber, and a carbon black having a specific nitrogen adsorption specific surface area is disclosed in Patent Document 1 (scope of the patent claims, working examples, and the like). It is described in Patent Document 1 that tan δ is reduced and fuel consumption is improved by the configuration disclosed in Patent Document 1.

CITATION LIST

Patent Literature

Patent Document 1: Japanese Unexamined Patent Application Publication No. 2006-63284A

SUMMARY OF INVENTION

Technical Problem

On the other hand, since the sidewall portion of a pneumatic tire is a place that is exposed to sunlight, cracks called ozone cracks may develop due to strong exposure to ultraviolet rays. Therefore, there is a demand for a rubber composition for a sidewall to have excellent durability (ozone resistance or fatigue resistance) when formed into a tire. Here, a known method for enhancing the durability of a rubber composition for a sidewall is a method of blending a large amount of wax so as to form a thin film of wax on the surface of the sidewall. However, when a large amount of wax is blended in this way, appearance defects tend to arise.

In addition, from the perspective of environmental concerns or the like, there is a demand for further improvements in fuel economy, which leads to a need for further improvements in low heat build-up in a rubber composition for a sidewall when formed into a tire.

Under such circumstances, when the present inventors prepared a rubber composition for a sidewall and produced a tire with reference to Patent Document 1, it became clear that it is necessary to further enhance the durability out of consideration of future enhancements in the required level of durability. In addition, it became clear that the low heat build-up of the obtained tire does not necessarily meet the level that is presently required.

Therefore, in the light of the above circumstances, an object of the present invention is to provide a rubber composition for a sidewall having excellent low heat build-up and durability when formed into a tire, and a pneumatic tire using the rubber composition.

SUMMARY OF INVENTION

As a result of conducting dedicated research on the problems described above, the present inventors discovered that the problems can be solved by using a natural rubber and/or an isoprene rubber and a modified polymer obtained by modifying a conjugated diene polymer with a nitrone compound in combination as a diene rubber and using a filler containing a carbon black having a specific nitrogen adsorption specific surface area, and the present inventors thereby completed the present invention.

Specifically, the inventors discovered that the object described above can be achieved by the following features.

(1) A rubber composition for a sidewall comprising a diene rubber and a filler containing carbon black;

the diene rubber comprising: a modified polymer obtained by reacting a nitrone compound with double bonds of a conjugated diene polymer; and at least one of a natural rubber and an isoprene rubber; a content of the modified polymer in the diene rubber being from 5 to 70 mass %;

a nitrogen adsorption specific surface area of the carbon black being from 20 to 60[×10$^3$ m$^2$/kg]; and a content of the filler being from 30 to 67 parts by mass per 100 parts by mass of the diene rubber.

(2) The rubber composition for a sidewall according to (1), wherein the content of the modified polymer in the diene rubber is from 8 to 65 mass %; and a content of the carbon black is from 30 to 67 parts by mass per 100 parts by mass of the diene rubber.

(3) The rubber composition for a sidewall according to (1), wherein the filler further contains silica;

a content of the at least one of the natural rubber and the isoprene rubber in the diene rubber is from 30 to 70 mass %;

a content of the carbon black is from 5 to 45 parts by mass per 100 parts by mass of the diene rubber;

a content of the silica is 15 to 55 parts by mass per 100 parts by mass of the diene rubber; and a total content of the carbon black and the silica is from 30 to 60 parts by mass per 100 parts by mass of the diene rubber.

(4) The rubber composition for a sidewall according to (3), wherein a CTAB adsorption specific surface area of the silica is from 50 to 230 m$^2$/g.

(5) The rubber composition for a sidewall according to any one of (1) to (4), wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(6) The rubber composition for a sidewall according to any one of (1) to (5), wherein a degree of modification of the modified polymer is from 0.02 to 4.0 mol %; the degree of modification represents a proportion (mol %) of double bonds modified with the nitrone compound relative to double bonds originating from conjugated diene of the conjugated diene polymer.

(7) The rubber composition for a sidewall according to any one of (1) to (6), wherein an amount of the nitrone compound reacted with the double bonds of the conjugated diene polymer is from 0.1 to 10 parts by mass per 100 parts by mass of the diene rubber.

The rubber composition for a sidewall according to any one of (1) to (7), wherein the modified polymer is a modified polymer obtained by reacting a nitrone compound with double bonds of a butadiene rubber.

(9) The rubber composition for a sidewall according to any one of (1) to (8) further comprising a wax.

(10) A pneumatic tire wherein the rubber composition for a sidewall described in any one of (1) to (9) is used in a sidewall portion.

Advantageous Effects of Invention

As described below, according to the present invention, a rubber composition for a sidewall having excellent low heat build-up and durability when formed into a tire and a pneumatic tire using the rubber composition can be provided.

BRIEF DESCRIPTION OF DRAWINGS

FIG. 1 is a partial cross-sectional schematic view of a tire that represents one embodiment of a pneumatic tire of the present invention.

DESCRIPTION OF EMBODIMENT

The rubber composition for a sidewall of the present invention and a pneumatic tire produced using the rubber composition for a sidewall of the present invention will be described hereinafter.

In this specification, a numerical range represented using "(from) . . . to . . . " refers to a range including the numerical values stated before and after the " . . . to . . . " as a lower limit value and an upper limit value.
Rubber Composition for Sidewall The rubber composition for a sidewall of the present invention (also called the "composition of the present invention" hereafter) contains a diene rubber and a filler containing carbon black.

Here, the diene rubber contains: a modified polymer obtained by reacting a nitrone compound with double bonds of a conjugated diene polymer; and a natural rubber and/or an isoprene rubber; the content of the modified polymer in the diene rubber being from 5 to 70 mass %. In addition, the nitrogen adsorption specific surface area of the carbon black is from 20 to 60[×10$^3$ m$^2$/kg], and the content of the filler is from 30 to 67 parts by mass per 100 parts by mass of the diene rubber.

The composition of the present invention is thought to have excellent low heat build-up and durability as a result of assuming such a configuration.

As described above, the composition of the present invention contains a modified polymer obtained by modifying a conjugated diene polymer with a nitrone compound. Therefore, nitrone residues (nitrone groups after modification) in the modified polymer interact with the carbon black in the composition (when the composition contains silica, the nitrone residues also interact with the silica in the composition) so as to increase the dispersibility of the carbon black (when the composition contains silica, this interaction also increases the dispersibility of the silica in the composition). As a result, the Payne effect is reduced, which is thought to yield excellent low heat build-up when formed into a tire.

This is also deduced from the fact that, as illustrated in the working examples and comparative examples described below, the low heat build-up is better when the composition contains a modified polymer (working examples of the present application) than when the composition does not contain a modified polymer (Comparative Examples 1 and 11 to 15).

Each component contained in the composition of the present invention will be described in detail hereinafter.

Diene Rubber

The diene rubber contained in the composition of the present invention contains: a modified polymer obtained by reacting a nitrone compound with double bonds of a conjugated diene polymer; and a natural rubber and/or an isoprene rubber. Here, the content of the modified polymer in the diene rubber is from 5 to 70 mass %.

Note that the diene rubber may contain rubber components other than the modified polymer and the natural rubber and/or the isoprene rubber described above. Such rubber components are not particularly limited, but examples thereof include butadiene rubber (BR), acrylonitrile-butadiene copolymer rubber (NBR), butyl rubber (IIR), butyl halide rubber (Br-IIR, Cl-IIR), and chloroprene rubber (CR). Of these, butadiene rubber is preferable.
Modified Polymer As described above, the diene rubber contained in the composition of the present invention contains a modified polymer obtained by reacting a nitrone compound with double bonds of a conjugated diene polymer.
Conjugated Diene Polymer The conjugated diene polymer used in the production of the modified polymer is not particularly limited, and examples thereof include natural rubber (NR), isoprene rubber (IR), butadiene rubber (BR), aromatic vinyl-conjugated diene copolymer rubber (for example, SBR), acrylonitrile-butadiene copolymer rubber (NBR), butyl rubber (IIR), halogenated butyl rubber (Br-IIR, Cl-IIR), and chloroprene rubber (CR). Of these, butadiene rubber (BR) is preferable. That is, the modified polymer is preferably a modified polymer obtained by reacting a nitrone compound with double bonds of a butadiene rubber.
Nitrone Compound The nitrone compound used in the production of the modified polymer is not particularly limited as long as the nitrone compound is a compound having a nitrone group represented by Formula (1) below.

[Chemical Formula 1]

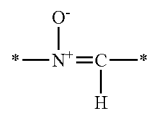

Formula (1)

In Formula (1), * indicates a bonding position.

The nitrone compound described above is preferably a compound represented by Formula (2) below.

[Chemical Formula 2]

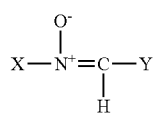

Formula (2)

In Formula (2), X and Y each independently represent an aliphatic hydrocarbon group, an aromatic hydrocarbon group, or an aromatic heterocyclic group which may have substituents.

Examples of the aliphatic hydrocarbon group represented by X or Y include alkyl groups, cycloalkyl groups, and alkenyl groups. Examples of the alkyl groups include methyl groups, ethyl groups, n-propyl groups, isopropyl groups, n-butyl groups, isobutyl groups, sec-butyl groups, tert-butyl groups, n-pentyl groups, isopentyl groups, neopentyl groups, tert-pentyl groups, 1-methylbutyl groups, 2-methylbutyl groups, 1,2-dimethylpropyl groups, n-hexyl groups, n-heptyl groups, and n-octyl groups. Among these, alkyl groups having from 1 to 18 carbons are preferable, and alkyl groups having from 1 to 6 carbons are more preferable. Examples of the cycloalkyl groups include cyclopropyl groups, cyclobutyl groups, cyclopentyl groups, and cyclohexyl groups. Among these, cycloalkyl groups having from 3 to 10 carbons are preferable, and cycloalkyl groups having from 3 to 6 carbons are more preferable. Examples of the alkenyl groups include vinyl groups, 1-propenyl groups, allyl groups, isopropenyl groups, 1-butenyl groups, and 2-butenyl groups. Among these, alkenyl groups having from 2 to 18 carbons are preferable, and alkenyl groups having from 2 to 6 carbons are more preferable.

Examples of the aromatic hydrocarbon group represented by X or Y include aryl groups, and aralkyl groups.

Examples of the aryl groups include phenyl groups, naphthyl groups, anthryl groups, phenanthryl groups, and biphenyl groups. Among these, aryl groups having from 6 to 14 carbons are preferable, aryl groups having from 6 to 10 carbons are more preferable, and a phenyl group and a naphthyl group are even more preferable.

Examples of the aralkyl groups include benzyl groups, phenethyl groups, and phenylpropyl groups. Among these, aralkyl groups having from 7 to 13 carbons are preferable, aralkyl groups having from 7 to 11 carbons are more preferable, and a benzyl group is even more preferable.

Examples of the aromatic heterocyclic group represented by X or Y include pyrrolyl groups, furyl groups, thienyl groups, pyrazolyl groups, imadazolyl groups (imadazol groups), oxazolyl groups, isooxazolyl groups, thiazolyl groups, isothiazolyl groups, pyridyl groups (pyridine groups), furan groups, thiophene groups, pyridazinyl groups, pyrimidinyl groups, and pyradinyl groups. Among these, pyridyl groups are preferable.

The substituents of the group represented by X or Y are not particularly limited, and examples thereof include alkyl groups having from 1 to 4 carbons, hydroxy groups, amino groups, nitro groups, carboxy groups, sulfonyl groups, alkoxy groups, and halogen atoms. Among these, carboxy groups are preferable.

Note that examples of the aromatic hydrocarbon group having such a substituent include aryl groups having a substituent, such as a tolyl group and xylyl group; and aralkyl groups having a substituent, such as a methylbenzyl group, ethylbenzyl group, and methylphenethyl group.

The compound represented by Formula (2) above is preferably a compound represented by Formula (3) below.

[Chemical Formula 3]

Formula (3)

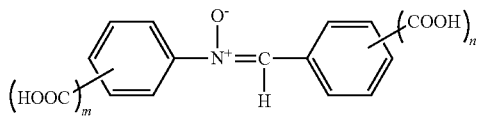

In Formula (3), m and n each independently represent an integer from 0 to 5, and the sum of m and n is 1 or greater.

The integer represented by m is preferably an integer from 0 to 2, and more preferably an integer 0 or 1, because solubility to a solvent during nitrone compound synthesis is better and thus synthesis easier.

The integer represented by n is preferably an integer from 0 to 2, and more preferably an integer 0 or 1, because solubility to a solvent during nitrone compound synthesis is better and thus synthesis easier.

Furthermore, the sum of m and n (m+n) is preferably from 1 to 4, and more preferably 1 or 2.

The carboxynitrone represented by Formula (3) is not particularly limited but is preferably a compound selected from the group consisting of N-phenyl-α-(4-carboxyphenyl)nitrone represented by Formula (3-1) below, N-phenyl-α-(3-carboxyphenyl)nitrone represented by Formula (3-2) below, N-phenyl-α-(-2-carboxyphenyl)nitrone represented by Formula (3-3) below, N-(-4-carboxyphenyl)-α-phenylnitrone represented by Formula (3-4) below, N-(-3-carboxyphenyl)-α-phenylnitrone represented by Formula (3-5) below, and N-(2-carboxyphenyl)-α-phenylnitrone represented by Formula (3-6) below.

[Chemical Formula 4]

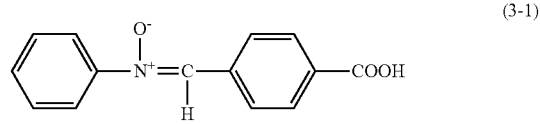

(3-1)

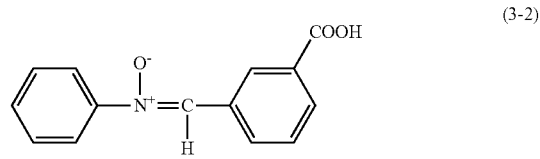

(3-2)

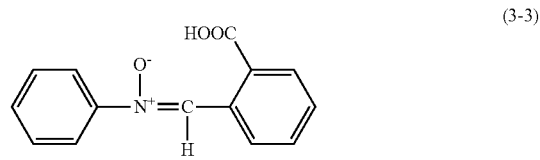

(3-3)

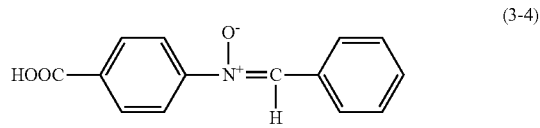

(3-4)

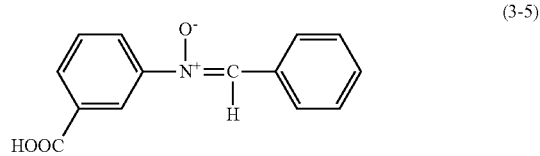

(3-5)

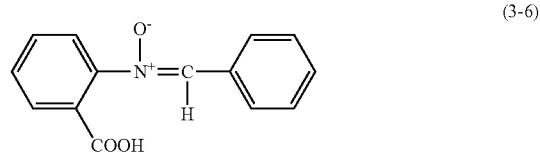

(3-6)

The method of synthesizing the nitrone compound is not particularly limited, and conventionally known methods can be used. For example, a nitrone compound having a nitrone group is obtained by stirring a compound having a hydroxyamino group (—NHOH) and a compound having an aldehyde group (—CHO) at a molar ratio of hydroxyamino group to aldehyde group (—NHOH/—CHO) of from 1.0 to 1.5 in the presence of an organic solvent (for example methanol, ethanol, tetrahydrofuran, and the like) at room temperature for 1 to 24 hours to allow the both groups to react, thereby yielding a nitrone compound having a nitrone group.

Method for Producing Modified Polymer

The method for producing a modified polymer by reacting a nitrone compound with double bonds of a conjugated diene polymer is not particularly limited, but an example thereof is a method of mixing the conjugated diene polymer described above and the nitrone compound described above for 1 to 30 minutes at 100 to 200° C.

At this time, a cycloaddition reaction occurs between the double bonds originating from conjugated diene in the conjugated diene polymer and the nitrone groups of the nitrone compound, forming a five-membered ring as illustrated in Formula (4) or Formula (5) below. Note that Formula (4) below represents a reaction between a 1,4 bond and a nitrone compound, and Formula (5) below represents a reaction between a 1,2-vinyl bond and a nitrone compound. In addition, Formulas (4) and (5) represent reactions for cases in which the conjugated diene is butadiene (1,3-butadiene), but five-membered rings may also be formed by the same reactions when the conjugated diene is a compound other than butadiene.

[Chemical Formula 5]

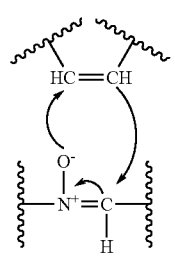

Formula (4)

[Chemical Formula 6]

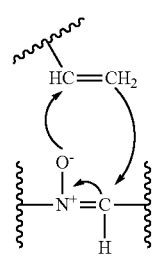

Formula (5)

The amount of the nitrone compound reacted with the double bonds of the conjugated diene polymer is not particularly limited but is preferably from 0.1 to 10 parts by mass and more preferably from 0.3 to 5 parts by mass per 100 parts by mass of the conjugated diene polymer. The amount of the nitrone compound reacted with the double bonds of the conjugated diene polymer is preferably greater than 1 part by mass per 100 parts by mass of the conjugated diene polymer.

Degree of Modification

The degree of modification of the modified polymer is not particularly limited but is preferably from 0.02 to 4.0 mol % and more preferably from 0.10 to 2.0 mol %. The degree of modification is preferably not less than 0.20 mol %.

Here, the degree of modification refers to the proportion (mol %) of double bonds modified with the nitrone compound relative to double bonds originating from the conjugated diene (conjugated diene diene units) of the conjugated diene polymer. For example, when the conjugated diene is butadiene (1,3-butadiene), the degree of modification represents the proportion (mol %) in which the structure of Formula (4) or (5) above is formed via modification by the nitrone compound. The degree of modification, for example, can be determined by NMR measurement of the conjugated diene polymer and the modified polymer (that is, the polymers before and after modification).

Note that in this specification, a modified polymer having a degree of modification of 100 mol % falls under the category of a diene rubber.

The content of the modified polymer in the diene rubber is from 5 to 70 mass %. Among these, the content is preferably from 8 to 65 mass %, more preferably from 20 to 60 mass %, even more preferably from 30 to 50 mass %, and particularly preferably not less than 40 mass %.

If the content of the modified polymer in the diene rubber is less than 5 mass % or greater than 70 mass %, the low heat build-up and/or durability of the resulting tire are insufficient.

Natural Rubber and/or Isoprene Rubber

As described above, the diene rubber contained in the composition of the present invention contains a natural rubber and/or an isoprene rubber.

The content of the natural rubber and/or the isoprene rubber in the diene rubber is not particularly limited as long as the content of the modified polymer in the diene rubber is from 5 to 70 mass % but is preferably from 30 to 70 mass %, more preferably from 20 to 60 mass %, even more preferably from 30 to 55 mass %, particularly preferably from 35 to 50 mass %, and most preferably from 30 to 40 mass %.

Filler

The filler contained in the rubber composition of the present invention is a filler containing carbon black.

The content of the filler is from 30 to 67 parts by mass and preferably from 30 to 60 parts by mass per 100 parts by mass of the diene rubber.

Carbon Black

The carbon black contained in the composition of the present invention is not particularly limited as long as the nitrogen adsorption specific surface area ($N_2SA$) thereof is from 20 to 60[×$10^3$ $m^2$/kg).

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

The content of the carbon black in the composition of the present invention is preferably from 30 to 67 parts by mass per 100 parts by mass of the diene rubber.

In addition, when the filler further contains silica, as described below, the content of the carbon black is preferably from 5 to 45 parts by mass and more preferably from 5 to 35 parts by mass per 100 parts by mass of the diene rubber, and from the perspective of achieving better low heat build-up and fatigue resistance, the content is even more preferably from 7 to 25 parts by mass.

Silica

The filler may further contain silica.

The cetyltrimethylammonium bromide (CTAB) adsorption specific surface area of the silica contained in the rubber composition of the present invention is preferably from 50 to 230 $m^2$/g and more preferably from 100 to 185 $m^2$/g.

Note that the CTAB adsorption specific surface area is an alternative characteristic of the surface area of the silica that can be utilized for adsorption to the silane coupling agent. The CTAB adsorption specific surface area is a value determined by measuring the amount of CTAB adsorption to the silica surface in accordance with JIS K6217-3:2001 "Part 3: How to Determine Specific Surface Area—CTAB Adsorption Method".

The content of the silica is preferably from 15 to 55 parts by mass and more preferably from 20 to 55 parts by mass per 100 parts by mass of the diene rubber, and from the perspective of achieving better low heat build-up and fatigue resistance, the content is even more preferably from 30 to 50 parts by mass.

From the perspective of low heat build-up and fatigue resistance, the total content of the carbon black and the silica is preferably from 30 to 60 parts by mass, more preferably from 35 to 60 parts by mass, and even more preferably from 40 to 60 parts by mass per 100 parts by mass of the diene rubber.

From the perspective of achieving better low heat build-up and fatigue resistance, the mass ratio of the carbon black and the silica (carbon black/silica) is preferably less than 1 and more preferably not greater than 0.5.

Optional Components

The composition of the present invention may further contain additives as necessary within a scope that does not inhibit the effect or purpose thereof.

Examples of the additive include various additives typically used in rubber compositions, such as silane coupling agents, zinc oxide (zinc white), stearic acid, resins for bonding, peptizing agents, antiaging agents, waxes, processing aids, aroma oils, liquid polymers, terpene-based resins, thermosetting resins, vulcanizing agents (for example, sulfur), and vulcanizing accelerators.

The composition of the present invention preferably contains a wax.

The wax is not particularly limited, but examples thereof include vegetable waxes (rice wax, candelilla wax, carnauba wax, Japan wax, sumac wax, sugar cane wax, palm wax, and the like), mineral-based waxes (montan wax, ozokerite, ceresin, waxes obtained from oil shale, and the like), and animal waxes (beeswax and the like).

A tire produced using the composition of the present invention has nitrone residues (nitrone groups after modification), so the polarity thereof changes. Therefore, when the composition of the present invention contains a wax, the transition of the wax to a tire surface is accelerated, and the cracking resistance is further enhanced. As a result, the tire produced using the composition of the present invention has better durability.

In the composition of the present invention, the content of the wax is not particularly limited but is preferably from 1 to 2.5 parts by mass per 100 parts by mass of the diene rubber from the perspective of appearance.

Method for Producing Rubber Composition for Sidewall

The method for producing the composition of the present invention is not particularly limited, and specific examples thereof include a method whereby each of the above-mentioned components is kneaded using a publicly known method and device (e.g. Banbury mixer, kneader, roll, and the like). When the composition of the present invention contains sulfur or a vulcanization accelerator, the components other than the sulfur and the vulcanization accelerator are preferably blended first at a high temperature (preferably from 80 to 140° C.) and then cooled before the sulfur or the vulcanization accelerator is blended.

In addition, the composition of the present invention can be vulcanized or crosslinked under conventional, publicly known vulcanizing or crosslinking conditions.

Application

The composition of the present invention is used in the production of pneumatic tires. Among these, the composition of the present invention is suitably used in the sidewall portion of a pneumatic tire.

Pneumatic Tire

The pneumatic tire of the present invention is a pneumatic tire produced using the composition of the present invention described above. Among these, the pneumatic tire of the present invention is preferably a pneumatic tire using the composition of the present invention in the sidewall portion.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

Note that the sidewall portion 2 is formed by the composition of the present invention described above.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Hereinafter, the present invention will be further described in detail with reference to examples; however, the present invention is not limited thereto.

Synthesis of Nitrone Compound

In a 2 L eggplant-shaped flask, methanol heated to 40° C. (900 mL) was placed, and then terephthalaldehydic acid represented by Formula (b-1) below (30.0 g) was added and dissolved. In this solution, a solution in which phenylhydroxylamine represented by Formula (a-1) below (21.8 g) was dissolved in methanol (100 mL) was added and stirred at room temperature for 19 hours. After the completion of stirring, a nitrone compound (carboxynitrone) represented by formula (c-1) below was obtained by recrystallization from methanol (41.7 g). The yield was 86%.

[Chemical Formula 7]

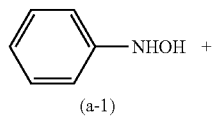 +

(a-1)

-continued

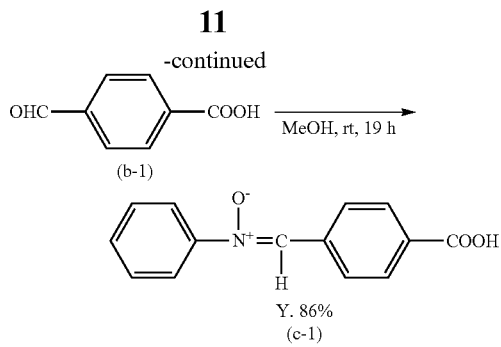

Synthesis of Modified Polymer (Modified Polymer 1)

A butadiene rubber (NIPOL BR1220 manufactured by the Zeon Corporation) was loaded into a 120° C. Banbury mixer and kneaded for 2 minutes. Next, 0.67 parts by mass of a nitrone compound synthesized as described above was added per 100 parts by mass of the butadiene rubber and mixed for 5 minutes at 150° C. so as to modify the butadiene rubber with the nitrone compound. The resulting modified polymer was used as the modified polymer 1.

When the degree of modification of the resulting modified polymer 1 was determined by NMR measurement, the degree of modification of modified polymer 1 was 0.16 mol %. Specifically, the degree of modification was determined as described below. Specifically, the polymers before and after modification were measured for the peak area (derived from two protons adjacent to the carboxy group) at around 8.08 ppm via $^1$H-NMR (CDCl$_3$, 400 MHz, TMS) using CDCl$_3$ as a solvent to find the degree of modification. Note that the samples used in the $^1$H-NMR measurement of the modified polymer were dissolved in toluene, purified by methanol precipitation two times, and then dried under reduced pressure.

Synthesis of Modified Polymer (Modified Polymer 2)

A butadiene rubber was modified with a nitrone compound in accordance with the same procedure as that of modified polymer 1 with the exception that the compounded amount of the nitrone compound was changed from 0.67 parts by mass to 1.67 parts by mass, that the mixing temperature was changed from 150° C. to 160° C., and that the mixing time was changed from 5 minutes to 2 minutes. The resulting modified polymer was used as the modified polymer 2.

When the degree of modification of the resulting modified polymer 2 was determined by NMR measurement, the degree of modification of modified polymer 2 was 0.37 mol %. The manner of determining the degree of modification was as described above.

Working Examples 1 to 3 and Comparative Examples 1 and 2

Preparation of Rubber Composition for Sidewall

The components shown in Table 1 below were compounded in the proportions (parts by mass) shown in Table 1.

Specifically, the components shown in Table 1 below, excluding sulfur and a vulcanization accelerator, were first mixed in a Banbury mixer with a temperature of 80° C. for 5 minutes. Next, sulfur and a vulcanization accelerator were mixed using a roll so as to obtain each rubber composition for a sidewall tire (a "rubber composition for a sidewall tire" is also simply called a "rubber composition" hereafter).

Production of Vulcanized Rubber Sheet

A vulcanized rubber sheet was prepared by press-vulcanizing each of the obtained (unvulcanized) rubber compositions for 15 minutes at 160° C. in a mold (15 cm×15 cm×0.2 cm).

Evaluation of Heat Build-Up

The loss tangent tan δ (60° C.) was measured for each obtained vulcanized rubber sheet using a viscoelastic spectrometer (manufactured by Toyo Seiki Seisaku-sho, Ltd.) under the following conditions: 10% initial distortion, ±2% amplitude, 20 Hz frequency, and temperature of 60° C. The results are shown in Table 1 (heat build-up). The results were shown as index values, with the tan δ (60° C.) of Comparative Example 1 expressed as 100. A smaller index value indicates superior low heat build-up when formed into a tire.

Evaluation of Ozone Resistance

Each obtained vulcanized rubber sheet was placed in an ozone tank (50° C., 100 pphm) and left for 48 hours in a 40% stretched state. The vulcanized rubber sheet was then observed, and the number of cracks with a length of 1 mm or more present on the surface were counted. The ozone resistance was evaluated based on the criteria described below. The results are shown in Table 1 (ozone resistance). From the perspective of practical utility, the value is preferably from 3 to 5 and more preferably 4 or 5.

1: rupture of the vulcanized rubber sheet
2: 21 or more cracks 1 mm or longer in length
3: 10 to 20 cracks of 1 mm or longer in length
4: more than 1 but fewer than 10 cracks 1 mm or longer in length
5: no cracks 1 mm or longer in length Evaluation of Appearance The obtained vulcanized rubber sheet was left to stand for two weeks in an oven at 40° C. The appearance was then visually observed, and a score was assigned based on the criteria described below (n=3). The average of n=3 (rounding off decimals) is shown in Table 1. The value is preferably from 3 to 5 and more preferably 4 or 5.

1 point: overall white discoloration
2 points: white discoloration of approximately 30% of the entire area
3 points: overall darkening
4 points: darkening of approximately 30% of the area
5 points: unchanged In Table 1, the values in terms of the CPN amount indicate the parts by mass of the nitrone compound used in the synthesis of the modified polymer with respect to 100 parts by mass of the diene rubber.

In addition, in Table 1, the degree of modification indicates the degree of modification of the modified polymer described above.

TABLE 1

|  | Comparative Example 1 | Comparative Example 2 |
|---|---|---|
| Natural rubber | 40 | 40 |
| Butadiene rubber | 60 | 60 |
| Modified polymer 1 |  |  |
| Modified polymer 2 |  |  |
| Carbon black | 50 | 50 |
| Zinc oxide | 3 | 3 |
| Stearic acid | 2 | 2 |
| Anti-aging agent | 3 | 3 |
| Wax | 1 | 3 |
| Oil | 12 | 12 |
| Vulcanization accelerator | 1.5 | 1.5 |
| Sulfur | 1 | 1 |

TABLE 1-continued

| | | |
|---|---|---|
| Value in terms of CPN amount (parts by mass) | — | — |
| Modification conditions | — | — |
| Degree of Modification (mol %) | — | — |
| Heat build-up (index) | 100 | 100 |
| Ozone resistance | 2 | 3 |
| Appearance | 2 | 1 |

| | Working Example 1 | Working Example 2 | Working Example 3 |
|---|---|---|---|
| Natural rubber | 40 | 40 | 40 |
| Butadiene rubber | 30 | | 30 |
| Modified polymer 1 | 30 | 60 | |
| Modified polymer 2 | | | 30 |
| Carbon black | 50 | 50 | 50 |
| Zinc oxide | 3 | 3 | 3 |
| Stearic acid | 2 | 2 | 2 |
| Anti-aging agent | 3 | 3 | 3 |
| Wax | 1 | 1 | 1 |
| Oil | 12 | 12 | 12 |
| Vulcanization accelerator | 1.5 | 1.5 | 1.5 |
| Sulfur | 1 | 1 | 1 |
| Value in terms of CPN amount (parts by mass) | 0.2 | 0.4 | 0.5 |
| Modification conditions | 150° C., 5 minutes | 150° C., 5 minutes | 160° C., 2 minutes |
| Degree of Modification (mol %) | 0.16 | 0.16 | 0.37 |
| Heat build-up (index) | 92 | 90 | 87 |
| Ozone resistance | 3 | 3 | 4 |
| Appearance | 3 | 4 | 3 |

The details of each component shown in Table 1 above are as follows.
Natural rubber: TSR20
Butadiene rubber: NIPOL BR 1220 (manufactured by Zeon Corporation)
Modified polymer 1: modified polymer 1 synthesized as described above
Modified polymer 2: modified polymer 2 synthesized as described above
Carbon black: Seast F (nitrogen adsorption specific surface area: 42 [×$10^3$ m$^2$/kg], manufactured by Tokai Carbon Co., Ltd.)
Zinc white: Zinc White No. 3 (Seido Chemical Industry Co., Ltd.)
Stearic acid: Stearic acid YR (manufactured by NOF Corporation)
Anti-aging agent: SANTOFLEX 6PPD (manufactured by Soltia Europe)
Wax: SANNOC (manufactured by Ouchi Shinko Chemical Industrial Co., Ltd.)
Oil: Extract 4S (manufactured by Showa Shell Sekiyu K.K.)
Vulcanization accelerator: Nocceler CZ-G (manufactured by Ouchi Shinko Chemical Industrial Co., Ltd.)
Sulfur: oil treatment sulfur (manufactured by Karuizawa Refinery Ltd.)

As can be seen from Table 1, in comparison to Comparative Example 1 which does not contain a modified polymer, Working Examples 1 to 3 which contain modified polymers all exhibited excellent low heat build-up and ozone resistance when formed into tires. In addition, although Comparative Example 2, which does not contain a modified polymer and has an increased compounded amount of wax, demonstrated excellent ozone resistance, the low heat build-up was insufficient, and appearance defects were observed.

In a comparison of Working Examples 1 and 2, Working Example 2, in which the content of the modified polymer in the diene rubber was not less than 40 mass %, demonstrated superior heat build-up and a superior appearance when formed into a tire.

Working Examples 11 to 15 and Comparative Examples 11 and 15

Preparation of Rubber Composition for Sidewall

The components shown in Table 2 below were compounded in the proportions (parts by mass) shown in Table 2.

Specifically, the components shown in Table 2 below, excluding sulfur and a vulcanization accelerator, were first mixed in a Banbury mixer with a temperature of 80° C. for 5 minutes. Next, sulfur and a vulcanization accelerator were mixed using a roll so as to obtain each rubber composition for a sidewall tire (a "rubber composition for a sidewall tire" is also simply called a "rubber composition" hereafter).

Production of Vulcanized Rubber Sheet

A vulcanized rubber sheet was prepared by press-vulcanizing each of the obtained (unvulcanized) rubber compositions for 15 minutes at 160° C. in a mold (15 cm×15 cm×0.2 cm).

Evaluation of Heat Build-Up

The loss tangent tan δ (60° C.) was measured for each obtained vulcanized rubber sheet using a viscoelastic spectrometer (manufactured by Toyo Seiki Seisaku-sho, Ltd.) under the following conditions: 10% initial distortion, ±2% amplitude, 20 Hz frequency, and temperature of 60° C. The results are shown in Table 2 below (heat build-up). The results were shown as index values, with the tan δ (60° C.) of Comparative Example 11 expressed as 100. A smaller index value indicates superior low heat build-up when formed into a tire.

Evaluation of Fatigue Resistance

Each obtained vulcanized rubber sheet was subjected to bending 300 times per minute at room temperature in a Demattia flex test in accordance with JIS K6260, and the number of bends until the cracking length reached 20 mm was determined. The results are shown in Table 2 below (fatigue resistance). The results were shown as index values, with the number of bends of Comparative Example 11 expressed as 100. A larger index value (that is, greater numbers of bends) indicates superior fatigue resistance.

In Table 2 below, the values in terms of the CPN amount indicate the parts by mass of the nitrone compound used in the synthesis of the modified polymer with respect to 100 parts by mass of the diene rubber.

TABLE 2

| | Comparative Examples | | Working Examples | |
|---|---|---|---|---|
| | 11 | 12 | 11 | 12 |
| Natural rubber | 40.00 | 40.00 | 40.00 | 40.00 |
| Butadiene rubber | 60.00 | 60.00 | 30.00 | — |
| Modified polymer 1 | — | — | 30.00 | 60.00 |
| Carbon black 1 | 50.00 | 30.00 | 30.00 | 30.00 |
| Silica 1 | — | 20.00 | 20.00 | 20.00 |
| Zinc oxide | 3.00 | 3.00 | 3.00 | 3.00 |
| Stearic acid | 2.00 | 2.00 | 2.00 | 2.00 |
| Anti-aging agent | 3.00 | 3.00 | 3.00 | 3.00 |
| Wax | 1.00 | 1.00 | 1.00 | 1.00 |
| Silane coupling agent | — | 1.60 | 1.60 | 1.60 |
| Process oil | 12.00 | 12.00 | 12.00 | 12.00 |
| Vulcanization accelerator | 1.50 | 1.50 | 1.50 | 1.50 |
| Sulfur | 1.00 | 1.00 | 1.00 | 1.00 |
| Value in terms of CPN amount (parts by mass) | 0.00 | 0.00 | 0.20 | 0.40 |
| Heat build-up | 100 | 101 | 96 | 85 |
| Fatigue resistance | 100 | 80 | 108 | 110 |

| | Comparative Example | Working Examples | |
|---|---|---|---|
| | 13 | 13 | 14 |
| Natural rubber | 40.00 | 40.00 | 40.00 |
| Butadiene rubber | 60.00 | 30.00 | — |
| Modified polymer 1 | — | 30.00 | 60.00 |
| Carbon black 1 | 10.00 | 10.00 | 10.00 |
| Silica 1 | 40.00 | 40.00 | 40.00 |
| Zinc oxide | 3.00 | 3.00 | 3.00 |
| Stearic acid | 2.00 | 2.00 | 2.00 |
| Anti-aging agent | 3.00 | 3.00 | 3.00 |
| Wax | 1.00 | 1.00 | 1.00 |

TABLE 2-continued

|  | | | |
|---|---|---|---|
| Silane coupling agent | 3.20 | 3.20 | 3.20 |
| Process oil | 12.00 | 12.00 | 12.00 |
| Vulcanization accelerator | 1.50 | 1.50 | 1.50 |
| Sulfur | 1.00 | 1.00 | 1.00 |
| Value in terms of CPN amount (parts by mass) | 0.00 | 0.20 | 0.40 |
| Heat build-up | 103 | 88 | 82 |
| Fatigue resistance | 70 | 112 | 116 |

|  | Comparative Examples | | Working Example |
|---|---|---|---|
|  | 14 | 15 | 15 |
| Natural rubber | 40.00 | 40.00 | 40.00 |
| Butadiene rubber | 60.00 | — | — |
| Modified polymer 1 | — | 60.00 | 60.00 |
| Carbon black 1 | 5.00 | 8.00 | 5.00 |
| Silica 1 | 60.00 | 60.00 | 55.00 |
| Zinc oxide | 3.00 | 3.00 | 3.00 |
| Stearic acid | 2.00 | 2.00 | 2.00 |
| Anti-aging agent | 3.00 | 3.00 | 3.00 |
| Wax | 1.00 | 1.00 | 1.00 |
| Silane coupling agent | 4.00 | 4.00 | 4.00 |
| Process oil | 12.00 | 12.00 | 12.00 |
| Vulcanization accelerator | 1.50 | 1.50 | 1.50 |
| Sulfur | 1.00 | 1.00 | 1.00 |
| Value in terms of CPN amount (parts by mass) | 0.00 | 0.40 | 0.40 |
| Heat build-up | 109 | 104 | 84 |
| Fatigue resistance | 71 | 105 | 108 |

The details of each component shown in Table 2 above are as follows.
Natural rubber: TSR20
Butadiene rubber: Nipol BR 1220 (manufactured by Zeon Corporation)
Modified polymer 1: modified polymer 1 synthesized as described above
Carbon black 1: SEAST F (nitrogen adsorption specific surface area: 42 m$^2$/g, manufactured by Tokai Carbon Co., Ltd.)
Silica 1: ZEOSIL 165GR (CTAB adsorption specific surface area: 155 m$^2$/g, manufactured by Rhodia Silica Korea Co., Ltd.)
Zinc oxide: Zinc Oxide III (Seido Chemical Industry Co., Ltd.)
Stearic acid: Stearic acid YR (manufactured by NOF Corporation)
Anti-aging agent: SANTOFLEX 6PPD (manufactured by Soltia Europe)
Wax: SANNOC (manufactured by Ouchi Shinko Chemical Industrial Co., Ltd.)
Silane coupling agent: Si69 (manufactured by Evonik Degussa)
Oil: Extract 4S (manufactured by Showa Shell Sekiyu K.K.)
Vulcanization accelerator: Nocceler CZ-G (manufactured by Ouchi Shinko Chemical Industrial Co., Ltd.)
Sulfur: oil treatment sulfur (manufactured by Karuizawa Refinery Ltd.)

As can be seen from Table 2, in comparison to Comparative Example 11 which does not contain a modified polymer and a filler, Working Examples 11 to 15 which contain modified polymers, carbon black, and silica all exhibited excellent low heat build-up and fatigue resistance.

In addition, in a comparison of Working Examples 11 and 12, Working Example 12 which has a greater amount of the nitrone compound exhibited superior low heat build-up and fatigue resistance. This was the same in a comparison of Working Examples 13 and 14.

In addition, in a comparison of Working Examples 11 and 13, Working Example 13 which has a carbon black/silicon mass ratio of less than 1 exhibited superior low heat build-up and fatigue resistance. This was the same in a comparison of Working Examples 12 and 14.

In contrast, Comparative Examples 2 and 3, which contain fillers but do not contain a modified polymer, exhibited poor low heat build-up and fatigue resistance in comparison to Comparative Example 1.

In addition, Comparative Example 4, which contains a filler but does not contain a modified polymer and has a filler content exceeding the range of 30 to 67 parts by mass per 100 parts by mass of the diene rubber, exhibited poor low heat build-up and fatigue resistance in comparison to Comparative Example 1.

Furthermore, Comparative Example 5, which contains a modified polymer and a filler but has a filler content exceeding the range of 30 to 67 parts by mass per 100 parts by mass of the diene rubber, exhibited an improvement in low heat build-up and fatigue resistance in comparison to Comparative Example 4, but exhibited poor low heat build-up in comparison to Comparative Example 1.

REFERENCE SIGNS LIST

1 Bead portion
2 Side wall portion
3 Tire tread portion
4 Carcass layer
5 Bead core
6 Bead filler
7 Belt layer
8 Rim cushion

The invention claimed is:

1. A rubber composition for a tire sidewall, said rubber composition comprising a diene rubber and a filler containing carbon black;
   the diene rubber comprising: a modified polymer obtained by reacting a nitrone compound with double bonds of a conjugated butadiene polymer; and at least one of a natural rubber and an isoprene rubber; a content of the modified polymer in the diene rubber being from 5 to 70 mass %;
   a nitrogen adsorption specific surface area of the carbon black being from $20 \times 10^3$ to $60 \times 10^3$ m$^2$/kg;
   the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone; and
   a content of the filler being from 30 to 67 parts by mass per 100 parts by mass of the diene rubber.

2. The rubber composition for a tire sidewall according to claim 1, wherein the content of the modified polymer in the diene rubber is from 8 to 65 mass %; and a content of the carbon black is from 30 to 67 parts by mass per 100 parts by mass of the diene rubber.

3. The rubber composition for a tire sidewall according to claim 1, wherein the filler further contains silica;
   a content of the at least one of the natural rubber and the isoprene rubber is from 30 to 70 mass %;
   a content of the carbon black is from 5 to 45 parts by mass per 100 parts by mass of the diene rubber;
   a content of the silica is 15 to 55 parts by mass per 100 parts by mass of the diene rubber; and
   a total content of the carbon black and the silica is from 30 to 60 parts by mass per 100 parts by mass of the diene rubber.

4. The rubber composition for a tire sidewall according to claim 3, wherein a CTAB adsorption specific surface area of the silica is from 50 to 230 m$^2$/g.

5. The rubber composition for a tire sidewall according to claim 1, wherein a degree of modification of the modified polymer is from 0.02 to 4.0 mol %; wherein the degree of modification represents a proportion (mol %) of double bonds modified with the nitrone compound relative to double bonds originating from conjugated diene of the conjugated diene polymer.

6. The rubber composition for a tire sidewall according to claim 1, wherein an amount of the nitrone compound reacted with the double bonds of the conjugated diene polymer is from 0.1 to 10 parts by mass per 100 parts by mass of the diene rubber.

7. The rubber composition for a tire sidewall according to claim 1 further comprising a wax.

8. A pneumatic tire wherein the rubber composition for a tire sidewall described in claim 1 is used in a sidewall portion.

9. The rubber composition for a tire sidewall according to claim 2, wherein a degree of modification of the modified polymer is from 0.02 to 4.0 mol %; wherein the degree of modification represents a proportion (mol %) of double bonds modified with the nitrone compound relative to double bonds originating from conjugated diene of the conjugated diene polymer.

10. The rubber composition for a tire sidewall according to claim 3, wherein a degree of modification of the modified polymer is from 0.02 to 4.0 mol %; wherein the degree of modification represents a proportion (mol %) of double bonds modified with the nitrone compound relative to double bonds originating from conjugated diene of the conjugated diene polymer.

11. The rubber composition for a tire sidewall according to claim 4, wherein a degree of modification of the modified polymer is from 0.02 to 4.0 mol %; wherein the degree of modification represents a proportion (mol %) of double bonds modified with the nitrone compound relative to double bonds originating from conjugated diene of the conjugated diene polymer.

* * * * *